United States Patent [19]

Smith

[11] 4,224,018
[45] Sep. 23, 1980

[54] INFRA-RED APPARATUS

[76] Inventor: Thomas M. Smith, 114 Villinger Ave., Cinnaminson, N.J. 08077

[21] Appl. No.: 863,251

[22] Filed: Dec. 22, 1977

Related U.S. Application Data

[63] Continuation-in-part of Ser. No. 775,838, Mar. 9, 1977, and Ser. No. 701,687, Jul. 1, 1976, abandoned, each is a continuation-in-part of Ser. No. 674,409, Apr. 7, 1976, Pat. No. 4,035,132.

[51] Int. Cl.$^2$ .............................................. F23D 13/12
[52] U.S. Cl. .................................................... 431/328
[58] Field of Search .................................. 431/328, 329

[56] References Cited

U.S. PATENT DOCUMENTS

| | | | |
|---|---|---|---|
| 1,502,807 | 7/1924 | Berger | 431/329 |
| 3,188,366 | 6/1965 | Flynn | 431/328 |
| 3,468,298 | 9/1969 | Teague et al. | 431/328 |
| 3,824,064 | 7/1974 | Bratko | 431/328 |
| 3,876,365 | 4/1975 | Hefling et al. | 431/329 |

FOREIGN PATENT DOCUMENTS 1095865  12/1954  France ...................... 431/328

Primary Examiner—Carroll B. Dority, Jr.
Attorney, Agent, or Firm—Connolly and Hutz

[57] ABSTRACT

Fibrous mat type burner can have mat pieced together with butt joints and very thin layer of resinous sealant uniting the pieces at the joint. Burners with elongated mats are thus readily manufactured, and can be packaged strapped together in pairs face-to-face and enclosed in telescoping carton halves that allow for packaging burners of different lengths. Simple cushioning strips such as of folded corrugated cardboard can be inserted between burner faces, and cushioning pads over outer edges of burner backs, before they are strapped together. Holes can be provided in the cushioning strips to hold them in place over fastener heads projecting from burner face. Burners with hat-shaped mats for enveloping and brazing heat-exchange tubes to tube sheet can be used individually or in pairs to effect such brazing on tube-and-sheet assemblies secured on rotating table and indexed into position under burners. Suction ring around bottom of burner draws off some hot combustion gases generated in burner. Lowering and raising of burner over top of tube-and-sheet assembly, as well as of suction head against bottom of tube-and-sheet assembly is conveniently effected using large-diameter suction piping with loose joints that allow pipe rotation to accomodate such movement. The tubes can be staked or expanded where they penetrate the tube sheet, to reduce the clearance between them.

3 Claims, 9 Drawing Figures

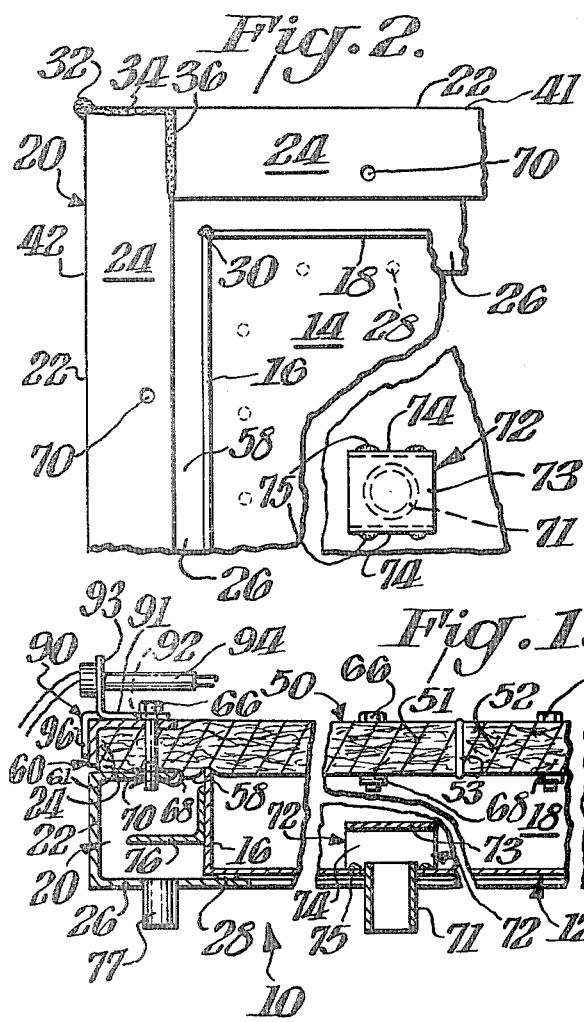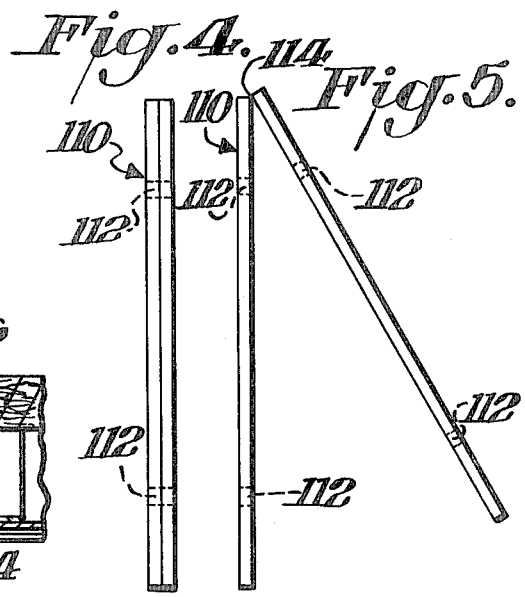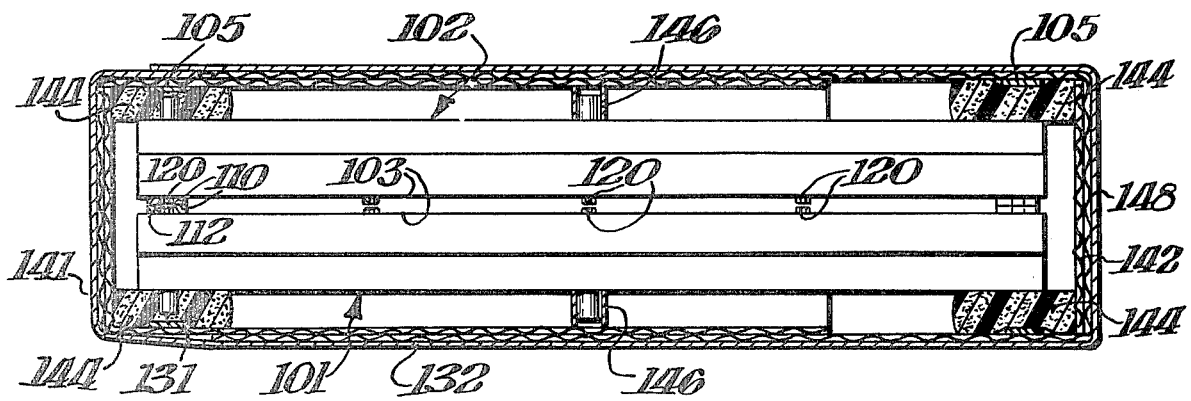

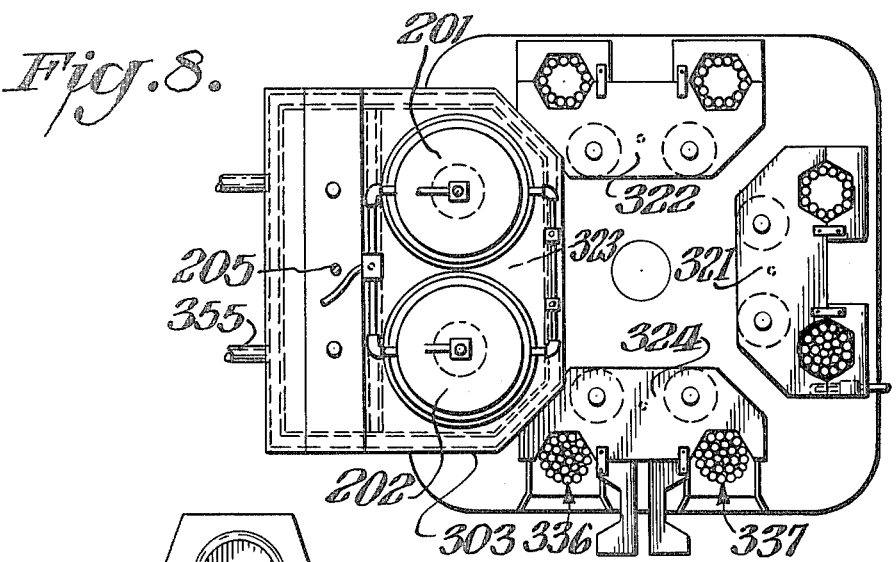
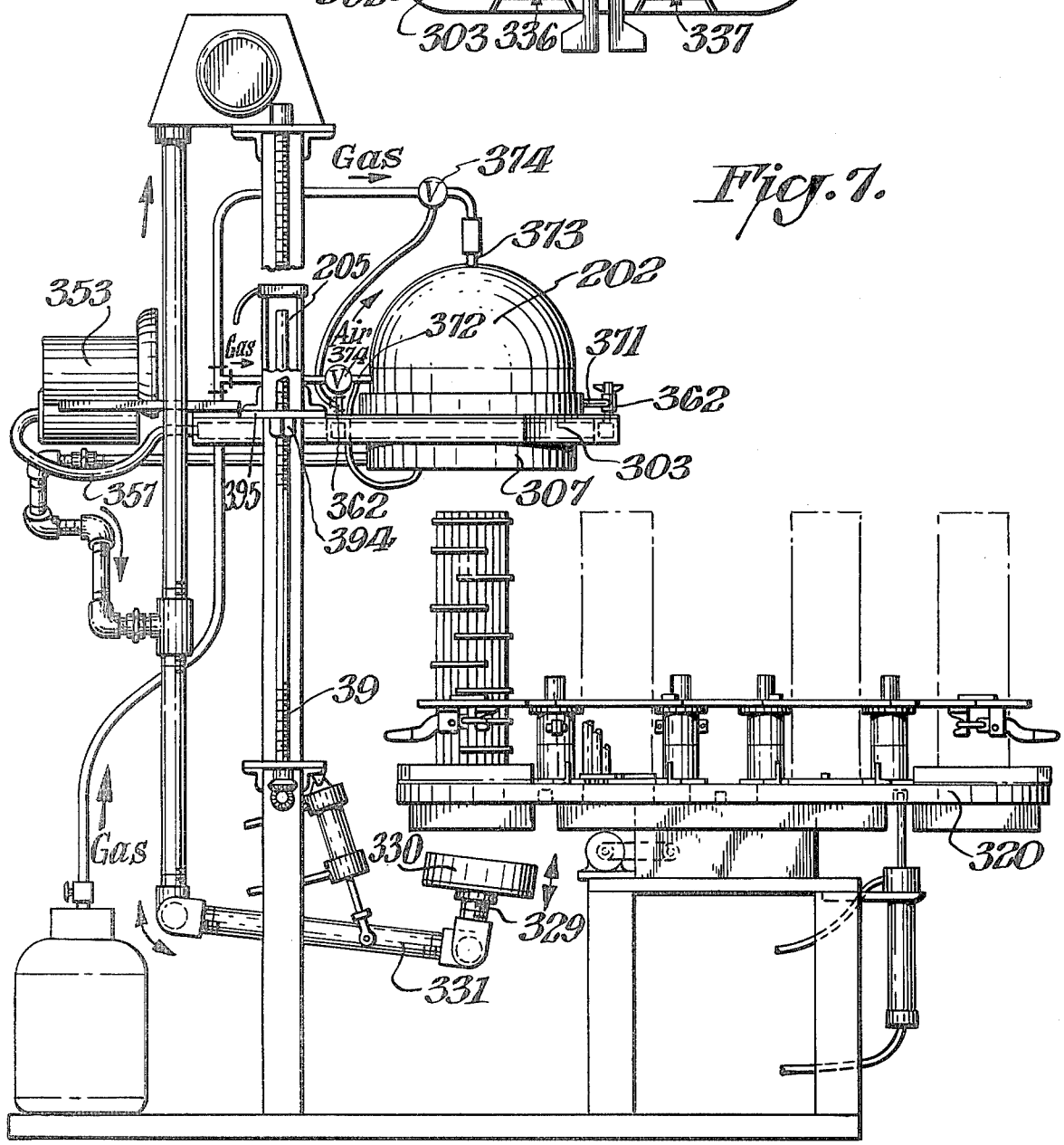
Fig. 8.
Fig. 7.

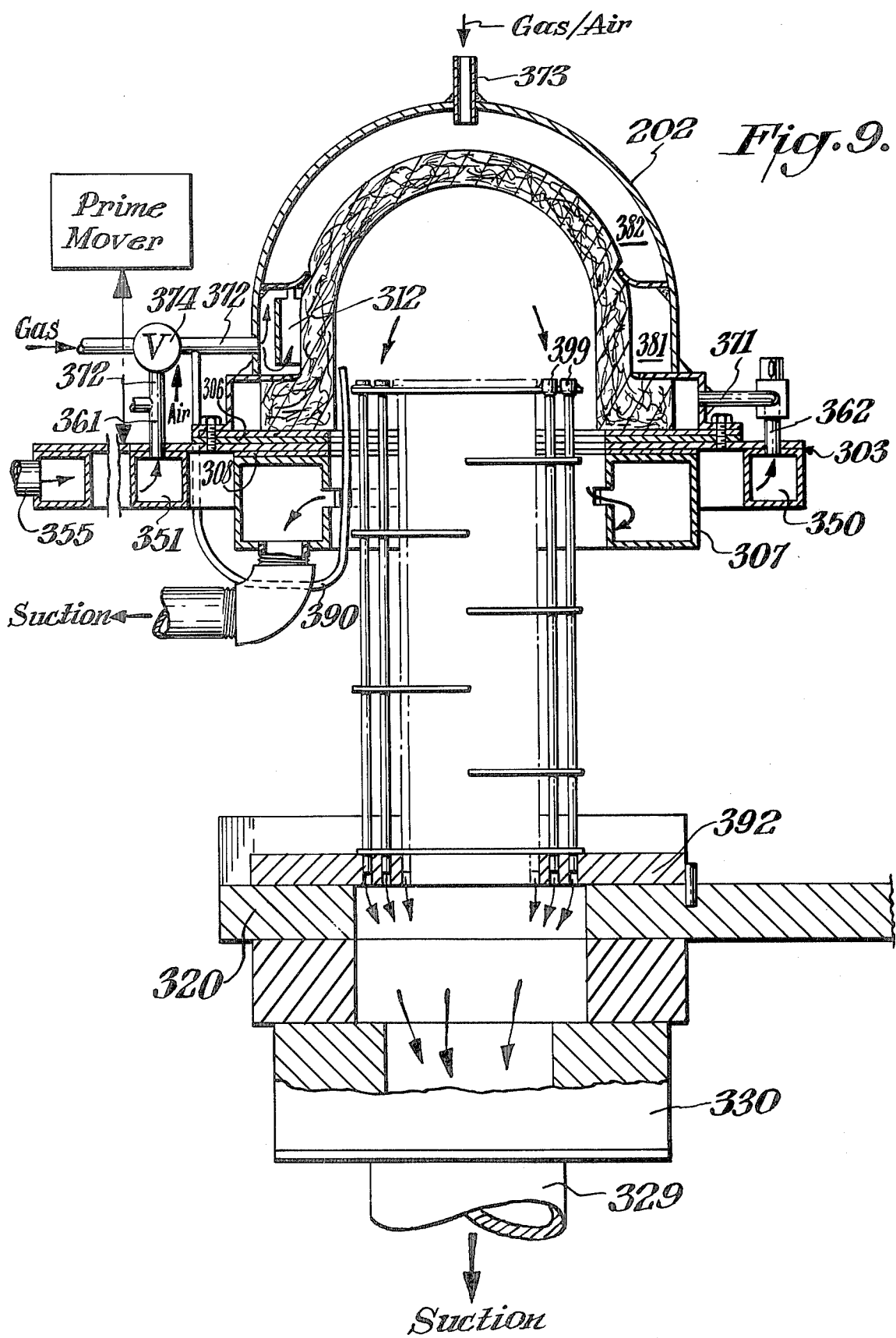

… … …

INFRA-RED APPARATUS

The present application is a continuation-in-part of applications Ser. No. 775,838, filed Mar. 9, 1977 and Ser. No. 701,687 filed July 1, 1976 (subsequently abandoned), both of which are in turn continuations-in-part of application Ser. No. 674,409 filed Apr. 7, 1976, now U.S. Pat. No. 4,035,132 granted July 12, 1977.

The present invention relates to apparatus for generating infra-red radiation.

Among the objects of the present invention is the provision of improved apparatus for generating and using infra-red radiation.

Additional objects of the present invention include the provision of novel packaging arrangements for such apparatus.

The foregoing as well as additional objects of the present invention will be clear from the following description of several of its exemplifications, reference being made to the accompanying drawings wherein:

FIG. 1 is a sectional view of one form of infra-red generator or burner according to the present invention;

FIG. 2 is a plan view of a corner detail of the burner of FIG. 1, with the upper members removed;

FIG. 3 is a view similar to that of FIG. 1 showing two infra-red generators packaged for shipment;

FIG. 4 is a side view of a packaging strip in the packaging arrangement of FIG. 3;

FIG. 5 is a side view of the packaging strip of FIG. 4, showing the strip partly unfolded;

FIG. 7 is a similar view of a modified brazing machine pursuant to the present invention;

FIG. 8 is a plan view of the machine of FIG. 7; and

FIG. 9 is a sectional view of the machine of FIG. 8 showing details of its infra-red generating and utilizing construction.

Figure 6:
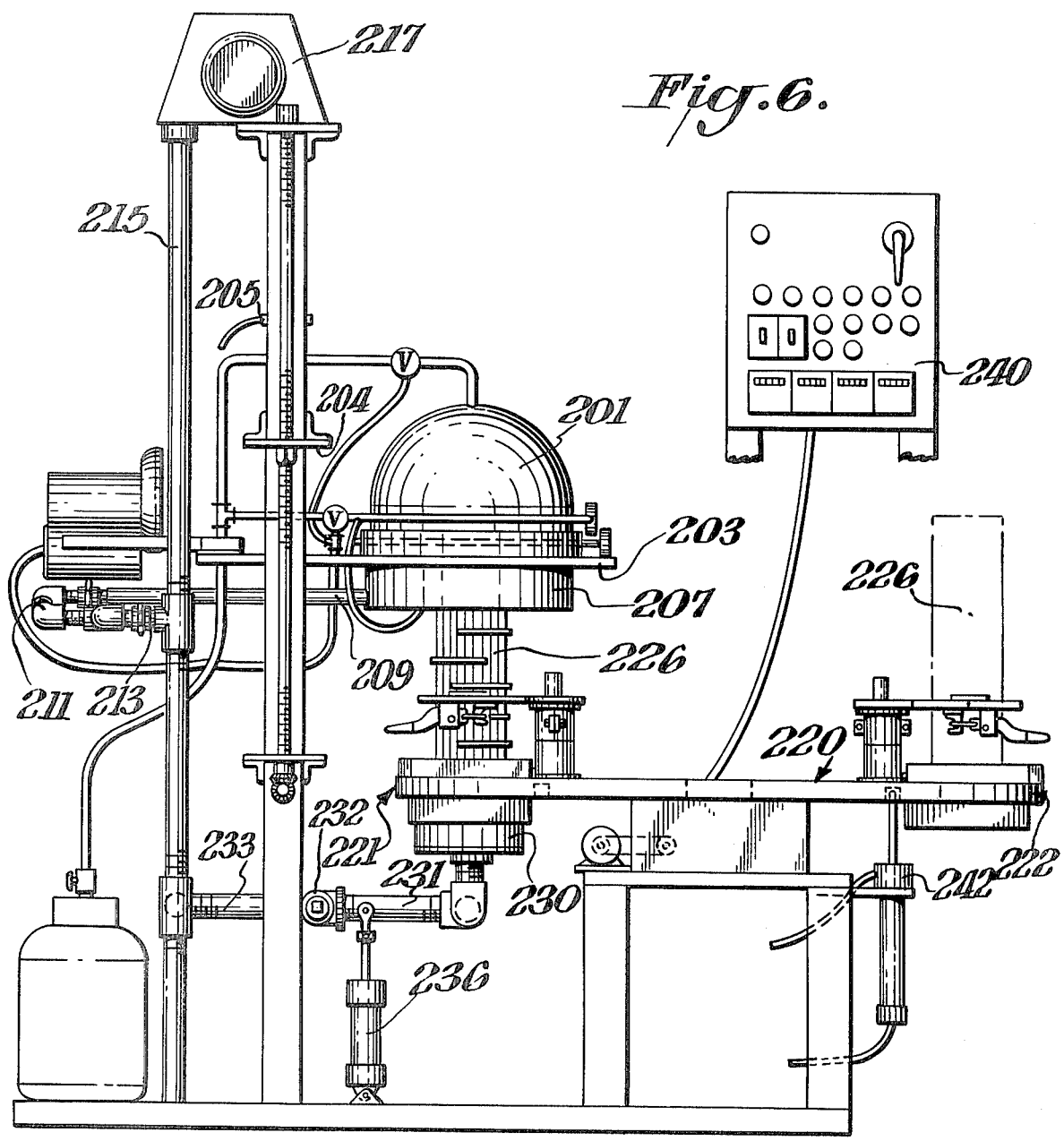
FIG. 6 is a side view of a different form of infra-red generating apparatus according to the invention, showing it as part of a brazing machine.

The infra-red generators of the present invention have a felted fiber matrix pad with extended surfaces and at least about ½ inch thick, through which pad a gaseous combustion mixture is passed to emerge from one surface and to burn at that surface to heat that surface to incandescence and thus generate infra-red energy. Generators of this type are described in U.S. Pat. Nos. 3,785,763 and 3,824,064, as well as in the above-noted parent applications.

Pursuant to one aspect of the present invention the matrix pad for a generator of the foregoing type, consists of at least two separate pieces of matrix butted together in edge-to-edge contact, the abutting edge faces being adhered to each other with a layer of silicone rubber not more than about 3 millimeters thick.

In such a cemented-together matrix pad it is preferred that the pad have its edges clamped in place in the generator, with each separate matrix piece extending to at least one of said edges.

Packaging of elongated burners having matrix pads so long that they are most readily made of adherently united matrix pieces, is greatly simplified by using telescopic packaging cartons. This is particularly desirable when burners of different lengths are being manufactured and are to be packaged for shipment.

According to this aspect of the present invention, two burners are strapped together in parallel with their front faces face-to-face, a first protective tubular carton closely fitted around the strapped-together burners, one end of the tubular carton being open, the other end being closed, another protective tubular carton telescoped over the first tubular carton and also having one end open the other end being closed, the tubular cartons facing in opposite directions and strapped together with their closed ends as the ends of the packaging combination, and packaging cushions cushioning the burner ends against the closed ends of the cartons.

Cushioning strip means is desirably sandwiched between the front faces of the strapped-together burners. Where the front faces of the burners have projecting fastener heads, such as of screws or the like, the cushioning strips used for the packaging are preferably perforated to receive the projecting heads, and thick enough to keep apart the faces and fastener heads of the strapped-together burners. Such cushioning strips are very conveniently made of folded-over lengths of corrugated cardboard.

A further aspect of the present invention involves an automatic apparatus using a radiant heater to seal heat-exchange tubes into tube sheets, as described in application Ser. No. 701,687, now abandoned.

According to the present invention such an apparatus contains a rotatable table having at least two indexing stations in its rotational path, and support means for holding an assembly of tubes and a tube sheet at each indexing station with the tubes positioned vertically, a radiant heater mounted over one indexing station and connected for automatic lowering and raising to surround the uppermost portion of the tube-and-sheet assembly at that station when the heater is lowered and to clear the tube-and-sheet assembly when the heater is raised, and a suction head movable between (a) a position under and in suction engagement with the tube-and-sheet assembly at the heater station and (b) a position that clears the table.

In the foregoing apparatus it is helpful to have the heater gas-fired, and to have a suction intake connected to draw off some of the gaseous combustion products from around the lower periphery of the heater.

A particularly simple movable suction connection can also be used for the suction head that is brought into and out of position below the tube-and-sheet assembly on the table. Thus the suction head can be carried by a suction pipe connected through a loose pipe connection to a suction source, the head being oriented for movement between positions (a) and (b) by rotation of the pipe around its axis, so that the loose pipe connection swivels to permit such head movement and also permits a small leakage into the suction source. This simplifies the use of a single source of suction connected to both the lower portion of the heater and the suction head below the table.

Another desirable feature pursuant to the present invention, is the use of two side-by-side heaters at the heating station of the automatic apparatus, to seal two side-by-side tube-and-sheet assemblies at one time.

Turning now to the drawings, the burner 10 of FIG. 1 has an elongated metal plenum trough 12 whose floor is shown at 14 and side walls at 16, 18. The floor can be 14 by 120 inches in size, by way of example, with side walls 16 then 14 inches long, and side walls 18 120 inches long. The heights of the side walls need only be about 2½ inches.

Around the periphery of the plenum trough 12 is secured a metal air-seal channel 20 having a web 22 and unequal flanges 24, 26. As illustrated flange 26 is longer than flange 24 and is spot welded by a series of spots, as at 28, to the bottom of plenum trough floor 14.

The corners of the plenum trough and of the air-seal channel are welded together as shown for illustrative purposes in FIG. 2. Weld 30 is a gas-tight joint between side walls 16 and 18. At the burner corner where air-seal webs 22 meet, a vertical weld 32 joins these webs, and additional welds 34, 36 join the flanges 24 together, and while these three welds can also be gas-tight, this is not essential.

The corner construction of the air-seal channel 20 as illustrated in FIG. 2 is made by notching out a square section of web 24 at the end of one rail 41 of the channel, and fitting the un-notched end of the adjacent rail 42 into place. The other flanges 26 of the channel rails can be similarly formed and assembled.

In many cases it is advantageous to use the corner construction of FIG. 2 because square notching can be performed more accurately than mitered notching as shown in U.S. Pat. No. 4,035,132. The product of FIG. 2 will then be simpler to weld together, even though a little extra welding is needed, and will present a better appearance.

If desired the side walls 16, 18 of the plenum trough can have their upper edges provided with a short horizontally extending lip as shown in U.S. Pat. No. 4,035,132, in which event the lip can have a corner construction corresponding to that of the air-seal rail flanges.

Burner 10 has a porous matrix pad 50 positioned over the flanges 24 and upper edges of side walls 16, 18. The matrix pad is clamped in place by a rectangular hold-down frame 60 that extends around the periphery of the pad and is secured to flanges 24 by a series of attaching screws 66. These screws can be threadedly engaged in spring clips 68 fitted over holes 70 in the flanges 24, or in nuts held in these holes by nut-holding clips or the like.

Frame 60 is provided with screw-receiving holes aligned with holes 70, and the screws and drawn up tightly enough to compress the matrix edges as described in Ser. No. 775,838 and substantially reduce the porosity of those edges. The matrix pad is preferably of self-supporting although somewhat resilient construction about an inch or 1⅛ inches thick with its edges compressed down to about 90% of its uncompressed thickness. The frame can have a notched corner construction similar to that of the air-seal rails shown in FIG. 2.

Because of the length of the burner, the matrix pad is made up of two pieces 51, 52, adherently united by a thin layer 53 of silicone rubber sealant. The joint is a simple butt joint and the adhesive layer thickness no greater than about 3 millimeters. The sealant is non-porous, but such a thin layer of sealant blocks off only a small and inconsequential portion of the face of the matrix pad. As a result the slight gap in the area over which the gaseous combustion mixture burns at the outer face of the pad, is of no consequence.

In use the incandescent condition of the surface fibers of the mat on both sides of the sealant layer 53 will cause the outermost portion of that layer to also get very hot and can partially decompose that portion. However the movement of the cool combustion mixture through the inner fibers of the matrix keeps them cool and also keeps the inner portions of the thin sealant layer cool. Thicker sealant layers are not kept so cool and show more thermal degradation. With the 3 millimeter thickness, the adhesive joint need only be about ½ inch deep to have a useful life of many months of operation.

The foregoing butt joint is much simpler to make than the tongue-and-groove joint used in the prior art with a sodium silicate type of adhesive deposited from aqueous solution. That type of joint is actually more porous than the adjacent portions of the matrix, and this tends to make the generation of infra-red energy much less uniform.

As in the constructions of the parent applications, the burner 10 is provided with connection nipples to supply the plenum with combustion mixture and to supply air to the interior of the air-seal channels. A nipple 71 for the plenum is shown as welded into trough floor 14 and a simple deflector baffle 72 welded above it to the inner face of that floor. That baffle is a short length of a channel that has only a body web 73 and two flanges 74, and is very simply tack welded as at locations 75, to the trough floor 14. If desired the baffle can be further simplified, as by making it a metal tab much like the bent tab baffle 76 shown for the air nipple 77, but having the bending angle an obtuse angle. One tab of such baffle can then be spot welded to the top of trough floor 14 alongside the nipple 71, to hold the remainder of the baffle at an angle over that nipple.

More than one combustion mixture supply nipple is used with burners as large as 120 inches. Two such nipples are enough, however, especially if symmetrically located about 60 inches apart along the burner's length, when the plenum is not partitioned into separate compartments. The plenum can be easily partitioned as by welding a sheet metal panel 81 in place in the trough, in which event there should be at least one combustion mixture supply nipple for each plenum compartment.

Panel 81 preferably does not extend into the air-seal channel, and it is not necessary to partition off the air seal, although this can be done as by a similar partition panel, if desired. The air-seal slot 58 by which air is discharged from the air-seal channel through the entire margin of the matrix pad, is preferably kept unobstructed. A gas-tight seal can be provided between partition panel 81 and the walls and floor of the plenum trough, but a simple spot welding is enough if the combustion mixture supply nipples are connected to gas and air sources arranged to supply only air to any plenum compartment that is not being fired while an adjacent compartment is being fired. The air pressure in the unfired compartment can then be made equal to or a little greater than the combustion mixture pressure in the fired compartment, to reduce the danger of combustion mixture leakage around the partition.

For some uses of the burners, they are arranged to generate infra-red energy over a variable length. Thus in the pre-drying of a wet fabric in a textile mill, the fabric processed can sometimes be as narrow as 30 inches or so, and sometimes as wide as 120 inches. The burners can then be partitioned as for example to provide a central plenum compartment 30 inches long, plenum compartments 20 inches long on either side of the central compartment, and plenum compartments 25 inches long at each end of the plenum. The appropriate compartments can then be fired to match the width of the fabric that is passed transversely in front of the burner for exposure to the infra-red energy.

It is preferred to have the hold-down frame 60 so dimensioned that its peripheral flange 61 lies in the same general plane as air plenum web 22 at all sides of the burner. This makes it unnecessary to have flanges 61 accurately located so as to fit around webs 22, and also uses less metal in frame 60.

The air nipple 77 can be mounted in the end wall 22 of the burner instead of in the burner back, if desired, in which case baffle 76 can be eliminated. Also said end placement can be duplicated on both ends of a burner, and the projecting air nipples and/or the pipe connections to them make convenient hanger mountings by which a burner can be held in pipe straps or U-bolts for examples. Such pipe straps or U-bolts can slidably hold the nipples or pipe connections, so as to more readily allow for thermal expansion of the burner body as it heats up and cools down.

The matrix pad can have more than one joint 53, and such joints can be located within a few inches of each other, if desired. It is preferred however that each piece of matrix thus joined have an edge secured under the hold-down frame 60. Where the matrix pieces being joined have good edges at the joint, no special preparation is needed. Where those edges are damaged or out of true, they can be readily cut as by a table saw with a fine-toothed saw blade, to provide true edges.

The silicone sealant is sufficiently viscous that it can be spread over a matrix edge without penetrating into the matrix fibers more than about ½ millimeter. Any of the commercially available silicone sealants are suitable. Sealants made of lower temperature non-porous materials such as natural rubber or neoprene or epoxy resins, can be used in place of the silicone sealant but they degrade more severely when the matrix they unite is fired, and so are not preferred. The use of a rubbery sealant such as silicone rubbers is helpful in that the curing of the sealant does not convert it to a hard material that could cause damage to the matrix fibers when the matrix is flexed during handling.

Burners of the foregoing type are very effectively packaged for shipment in the manner illustrated in FIG. 3. Two burners 101 and 102 are secured together with their matrix faces 103 face-to-face. Ordinary steel or plastic strapping 105 can be wrapped around the ends of the assembled burners, tightened and clamped in place, as a convenient way to so secure the burners.

Before assembling the burners in this face-to-face arrangement, it is particularly desirable to insert several cushioning strips 110 between them so as to cushion them against each other. A simple and highly effective cushioning strip construction is shown in FIG. 4 and FIG. 5. It is merely a narrow strip of 3/16 inch thick corrugated cardboard having holes 112 cut through, and scored at 114 so that it folds readily into the doubled-over position shown in FIG. 4. Holes 112 are spaced the same distance as the fastener heads 120 of a burner so that the cushioning strip is readily placed over a pair of such heads and thus holds itself in place until the second burner is placed over the strip.

Strips 110 in doubled-over condition are thick enough, ⅜ inch for example, to hold the burners apart so that they do not directly contact each other. Thus the hold-down frames 122 as well as the fastener heads 120 of the face-to-face burners are kept out of contact. One cushioning strip at each end of a burner is all the cushioning needed between short burners. Longer burners preferably have additional cushioning strips along their long edges.

The burners are desirably manufactured with their fastener heads 120 a standard distance apart, six inches for example, both along the length as well as the width of the burner, so that a single cushion strip configuration can be readily inserted anywhere. Such a cushion strip should have a length no greater than the narrow width of the burner face, and an eleven inch length works well with burners 14 inches wide. The matrix surface of such burners are also generally 11 inches wide and thus coextensive with the cushioning.

After the burners are strapped together the strapped assembly is inserted in a telescoping cushion-walled carton made of two tubular carton sections 131, 132. These sections are preferably of folded and pasted corrugated cardboard construction each having one end of its tubular length closed by an end wall 141, 142 respectively, the opposite ends of the tubular carton sections are open.

Packaging pads 144, of plastic foam for example, are best positioned under straps 105 and thus held so that they project beyond the longitudinal ends of each burner and the burner assembly does not tend to damage the end walls of the carton sections. Tubular protector sleeves or caps 146 can be placed over projecting nipples to protect them as well as keep them from damaging the adjacent carton walls. Pads 144 project beyond the backs of the burners a distance greater than the nipples, preferably as far as sleeves 146, and are readily penetrated by any air-seal nipples that they cover. These pads are thick enough to extend beyond the outer ends of such nipples.

The cartoned assembly can now be strapped together, as shown by strapping 148, and will withstand very rough handling.

The telescoping character of the carton sections permits the same pair of carton sections to be used to package burners of different lengths so long as their widths and depths are about the same. This is important because the burners are generally of about the same widths and depths but are required to have specific lengths which can vary widely from one installation to another. The burners are generally used in pairs, both burners of a pair being identical in length as well as in width.

The burners can be provided with any desired ignition means, such as a pilot flame or electric sparking. In FIG. 1 a spark ignition attachment is shown as a bracket 90 having a web 91 with a mounting hole or slot 92 for insertion under the head 66 of one of the fasteners. A flange 93 bent out from one portion of web 91 has a mounting hole or slot for holding a spark ignitor 94 so that its sparking end is located over the matrix portion through which the combustion mixture passes. Another flange 96 can be provided to engage the side of the hold-down frame 60 and thus more positively locate the ignitor.

The ignitors can be readily installed in the field, and are accordingly not needed to be packaged in the packaging arrangement of FIG. 3. However that packaging provides empty spaces between the cartoning and the backs of the burners, and a separate envelope containing ignitors or ignitor parts can be fitted in those spaces.

The burners of the present invention can have a flat matrix face, as in FIGS. 1 and 3, or a concave or convex matrix face, as described in the parent applications. The concave type matrix face radiates energy that can be highly concentrated in a limited area, and is particularly suitable for heating such areas to very high temperatures, or for very rapidly heating up such areas. An example of such rapid heating up is described in Ser. No. 701,687.

FIG. 6 shows a modification of the rapid heating device. The apparatus of FIG. 6 has a dome-shaped burner in a head 201 carried by a plate 203 that can be lifted and lowered with respect to an adjustable support 204 by an automatic arrangement, such as an electrically controlled hydraulic cylinder 205. Below the plate and surrounding the open bottom of the burner is a suction duct 207 that has its central wall perforated to draw off gaseous combustion products generated by the burner. Duct 207 is connected through suitable piping 209, 211, 213 to a suction bus 215 which in turn is connected to the suction intake of a motor-driven centrifugal blower 217.

A rotating table 220 is positioned with one portion of it 221 below burner head 201 and defining a station at which a work-piece, in this case a tube-and-sheet heat exchange assembly 226, is held just under the burner head as described in Ser. No. 701,687.

The tubes are preferably staked or otherwise expanded at their ends so as to reduce the clearance between the outer surface of the tube and the edge of the hole in the tube sheet through which that end penetrates. The expansion is easily effected as by driving a suitably sized hard three-ribbed, bulbous tool about ½ inch into a tube end, while the tube is securely supported. This deforms the tube wall radially outwardly, particularly at each rib, and causes the expanded tube portion to expand beyond the limit set by the size of the surrounding aperture in the tube sheet, locking the tube sheet in place by expansion both immediately above and immediately below the sheet. Withdraw of the expansion tool can leave the tube end in the shape illustrated at 399 in FIG. 9.

A suitable expansion tool is conveniently made by grinding a bulbous nose on a length of drill rod, then grinding three generally tangential flats equally spaced around the major diameter of the bulb. Flats about 20 to 30 thousandths of an inch deep easily allow about 8 mils expansion.

Expanding all the tube ends at each end of the tube bundle is desirable, but even expanding a few tubes helps lock the tube sheet in place against the expanded tube ends.

Another portion 222 of the table is out from under the burner head and provides another station where the work-piece can be fitted to the table in accurately located position, as by clamps, so that it will be properly located under the burner head when the table is rotated to bring the work-piece to station 221.

Below station 221, a suction head 230 is held on piping 231, 232, 233 that connects it to suction bus 215, and is arranged to be automatically lifted and lowered as by hydraulic cylinder 236, so that it can controllably apply suction to the lower ends of the tubes in the tube-and-sheet assembly. This application of suction draws some of the hot gaseous combustion products from the burner down through the upper ends of the tubes to effect more uniform and more rapid heat-up of the entire upper end of the assembly. A more complete discussion of the operation by which all the tube ends are sealed by brazing alloy to the upper tube sheet is contained in Ser. No. 701,687 the entire contents of which are hereby incorporated in the present application as though fully set forth herein.

The various suction pipes 209, 211, 213, 231, 232, 233 are of fairly large diameter, such as 3 inches, to adequately apply the suction. One very inexpensive type of piping to use for this purpose is standard cast iron pipe with lengths of it threadedly interconnected, using standard connection fittings such as elbows and tees. To permit the up and down movement of the burner head 201 as well as of the suction head 230, some of the threaded pipe joints can be left a little loose, even though such looseness permits leakage of air into the suction pipe. Thus a loose fit of pipes 209, 213 with the elbows that connect them to pipe 211 permits vertical suction head travel to lift and lower pipe 209 with respect to pipe 213, without significantly affecting the application of suction to duct 207. Similarly a loose connection of pipe 232 with the tee that connects it to pipe 231 permits the suction head movement. In each case the loosely threaded joints are those in which the threading axis is the axis around which rotation takes place.

Instead of merely having a simple threaded connection loosely engaged, the looseness can be provided by fitting a standard three-piece union connector to the pipe. Such a standard union has two separate pipe-engaged parts that can be coupled together by the third part to make a tapered or conical joint. For the purpose of the present invention the two pipe-engaging parts are each tightly threaded or otherwise tightly secured to the respective pipe lengths to be connected, but the third or coupling part of the union does not tightly couple the first two parts together. Instead the coupling part, which is generally threadedly engaged, is left incompletely threaded. It can be secured in the incompletely threaded condition, as by a set screw threaded through the coupling part and jammed against the pipe-engaging part to which it is incompletely threaded. This keeps the coupling thread from rotating so that rotation is provided solely between the tapered or conically mating surfaces of the pipe-engaging parts. These mating surfaces are smooth and not exposed to the outside, so that they are not likely to become jammed by dust or dirt, like exposed loose thread joints.

The apparatus of FIG. 6 is operated as by an automatic pre-settable electric controller 240, to rotate table 220 indexing it accurately into position while the burner and suction heads 201, 230 are held out of the way, then lowering the burner head, and igniting the burner, followed by raising the suction head, all timed to get the work-piece properly heated and sealed. The burner can then be extinguished, the burner head raised out of the way, the suction head lowered out of the way, and the table indexed around to carry the sealed work-piece to station 222 where it is removed and replaced by a fresh work-piece. While such removal and replacement are being effected, a work-piece previously mounted at that station but now at the sealing station, is automatically subjected to the sealing sequence. Thus at each indexing of the table one sealing operation is completed.

The suction duct 207 is spaced from the top of the work-piece by at least about ½ inch, and its sucking effect on the gaseous combustion products does not interfere with the action of the suction head 230 which engages fairly tightly with the bottom ends of the tubes and draws hot combustion products down into those tubes.

The burner in head 201 is preferably equipped with an air-seal margin as in Ser. No. 775,838, and with two plenum compartments as in Ser. No. 701,687. Also the plate carrying the burner head can also carry a blower that provides the air for mixing with gas to make the combustion mixture. No flexing connection is accordingly needed for the blower air. The gas for combustion can be supplied through a flexible connection, but since the quantity of gas used can be only about one-tenth as much as the air used, the gas line can be of very small diameter, such as ⅛ inch or less. Flexible tubing for such thin lines are no problem.

The combustion mixture is supplied to the burner at a rate as high as 100,000 BTU per hour and can complete a sealing heat-up in thirty seconds or less, even when the work-piece being sealed is a collection of fifty tubes each having a 20 mil wall thickness and an internal diameter of ¼ inch. In practice the sealing operation can take somewhat over 30 seconds. The sealed tube-and-sheet assembly needs several minutes of cooling before it is handled, so that in many cases sealing times close to a minute are available between indexing steps of the table.

The indexing positions of the table can be accurately aligned as by a locating pin 242 hydraulically or pneumatically raised to engage a locating socket in the lower surface of the table. The table rotation is preferably cam operated with its rotational speed varied so as to be quite low as it nears an indexing position, and substantially higher during most of its travel between indexing positions. A very desirable time for effecting an indexing step is about ten seconds or somewhat less.

The construction of FIGS. 7, 8 and 9 is a modified tube-to-sheet brazing machine having a table 320 with four indexing stations 321, 322, 323, 324 at each of which two tube bundles 336, 337 are arranged to be clamped in place side by side. At station 323 two burners 201, 202 are located and held in a frame 303 in side by side relationship corresponding to that of the tube bundles. The frame accordingly carries both burners down into heating position over the two tube bundles at station 323.

Frame 303 is illustrated as having a periphery made of square tubing 350 traversed by a cross tube 351 interconnected with the peripheral tubing. This frame tubing is arranged to conduct air from a blower 353 to both burners, one or more intake nipples 355 being connected by hose 357 to the air outlet of the blower, and discharge nipples 361, 362 being provided close to the burners for connection to the various burner inlets. One inlet 371 receives air only, for use as marginal air seal pursuant to the parent applications. Two other burner inlets 372, 373 are connected to mixing valves 374 that can be separately controlled to independently deliver air or air-gas mixtures to two separate plenums 381, 382 of each burner.

A suction conduit 331 is branched to provide two separate suction heads 330, one for the lower end of each tube bundle at station 323. The use of a single suction head that spans across both tube bundles and has only one suction connection is not desirable inasmuch as such an arrangement tends to cause the suction application to be too non-uniform; a little high in locations close to the suction connection and a little low in locations remote from that connection. The preferred suction connection is a conduit 329 axially aligned with the tube bundle through which it sucks gas downwardly.

Strips of thermal insulation 306, 308 can be inserted between frame 303 and the burner bottom, as well as between the frame and the suction ring 307, to help keep the frame from excessive heating. A baffle 312 can also be secured to the partition between burner plenums, to help direct the combustion mixture flow in plenum 381.

The apparatus of FIGS. 8 and 9 with its greater number of table stations has its table rotate from one station to the next in less time than that of FIG. 6, and has twice as many tube bundles brazed at each station. The combined result is a sharp increase in output. To operate the two-burner apparatus at its highest efficiency both burners are adjusted to supply about the same heat output, so that the sealing time is not lengthened unnecessarily by a lower heat output from one burner. If desired the two burners can be timed so that one burns for a somewhat different time than the other, to help compensate for heat output differences or the like. Thus one tube bundle can be previously unheated, and its companion bundle can be hot from a brazing that has just been completed on its opposite end or elsewhere, and accordingly needs slightly less heat-up.

A pilot gas line 390 can be used to supply a small pilot flame that ignites the burner each time either plenum is supplied with combustion mixture. The burners can also be operated by merely turning them down, rather than completely off, between sealing steps, in which event the pilot can be eliminated and ignition provided only when the apparatus is placed in operation.

The table holding the tube bundles can be provided with replaceable and interchangeable inserts 392 that are specially shaped, drilled and positioned to receive the lower ends of different types of tube bundles. For bundles of different heights, the frame 303 is arranged to be set at different levels as by the rotatable long threaded shafts 393 threadedly engaged in nuts 394 welded to a cross bracket 395 against which frame 303 is held by its hydraulic operator or other prime mover.

The burners described above are desirably constructed with their metal portions made of sheet metal that can be as thin as 30 to 50 thousandths of an inch. The metal housing for the hat-shaped burners can be drawn or spun, preferably of aluminum, and the metal housings for the flat burners are conveniently of bent and welded-together stainless steel members. Where a flat burner is particularly long and has few pipe connections, it is conveniently stiffened as by welding an extra length of channelling or tubing to the back of the longitudinally-extending sections of the air-seal channel.

The hat-shaped matrixes for the burners of FIGS. 6 through 9 can be formed in one piece or they can be pieced together. Thus the brim of the hat can be cut out from a flat matrix sheet and joined to the crown-shaped matrix portion. The crown-shaped portion can be formed by interfelting the ceramic fibers from a suspension in air or water, in a porous mold made of wire screening shaped to provide the desired crown. The margin of the crown can then be butt-joined to the brim by any of the above-mentioned resinous sealants.

Although the layer of sealant used is extremely thin, it makes an effective block against movement of gas through it. The marginal air-seal air flow for the hat-shaped burner can accordingly be through the entire height of the brim of the hat up to the sealant layer, so that combustion mixture does not have to flow through a narrow matrix portion below that layer.

Obviously many modifications and variations of the present invention are possible in the light of the above teachings. It is therefore to be understood that within the scope of the appended claims the invention may be practiced otherwise than as specifically described.

What is claimed:

1. In a gas-fired infra-red generator having a felted fiber matrix pad with extended surfaces and at least about ½ inch thick through which pad a gaseous combustion mixture is passed to emerge from one surface and to burn at that surface to heat that surface to incandescence and thus generate infra-red energy, the improvement according to which the matrix pad consists of at least two separate pieces of matrix butted together in edge-to-edge contact, the abutting edge faces being adhered to each other with a layer of silicone rubber not more than about 3 millimeters thick.

2. The combination of claim 1 in which the matrix pad has its edges clamped in place in the generator, and each piece of matrix extends to at least one of said edges.

3. The combination of claim 1 in which the matrix pad consists of two pieces, and all outer edges of the matrix and are clamped in place in the generator.

* * * * *

UNITED STATES PATENT AND TRADEMARK OFFICE
CERTIFICATE OF CORRECTION

PATENT NO. : 4,224,018
DATED : Sep. 23, 1980
INVENTOR(S) : Thomas M. Smith

It is certified that error appears in the above-identified patent and that said Letters Patent are hereby corrected as shown below:

Column 12, last line, "and" should be --pad-- .

Signed and Sealed this

Third Day of March 1981

[SEAL]

Attest:

RENE D. TEGTMEYER

Attesting Officer

Acting Commissioner of Patents and Trademarks